June 22, 1948.　　　　J. C. ARRISON　　　　2,443,760
UNIVERSAL HUB-CAP FOR AUTOMOBILES
Filed Oct. 26, 1946　　　　　　　　　　2 Sheets-Sheet 1
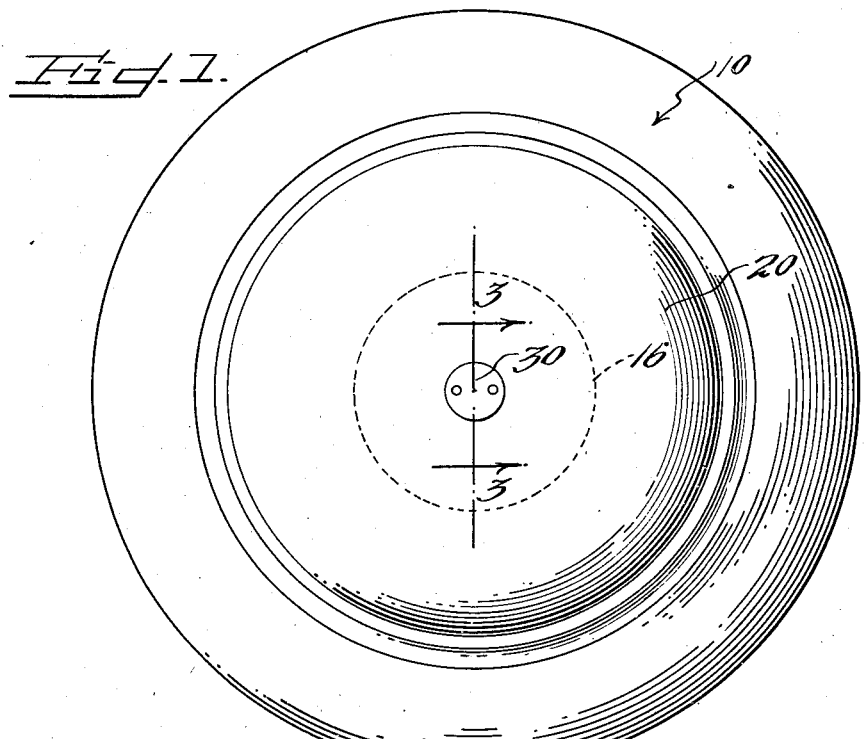
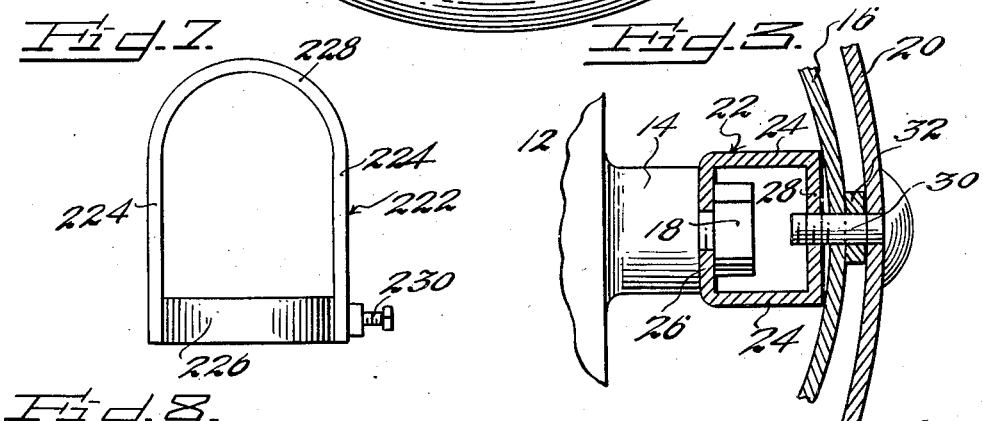
Inventor
JOHN C. ARRISON.
By Clarence A. O'Brien
and Harvey B. Jacobson
Attorneys June 22, 1948.  J. C. ARRISON  2,443,760
UNIVERSAL HUB-CAP FOR AUTOMOBILES
Filed Oct. 26, 1946  2 Sheets-Sheet 2
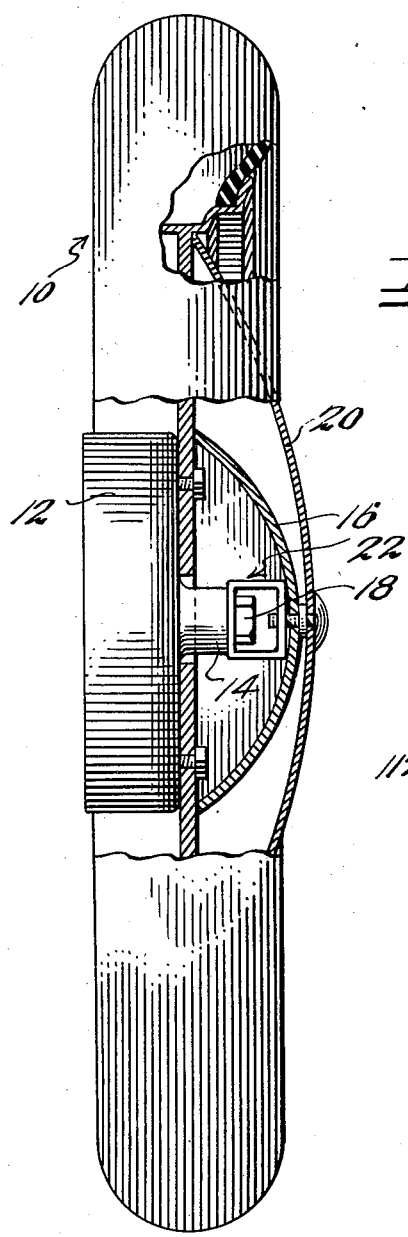
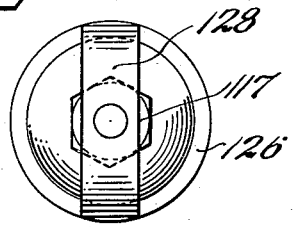
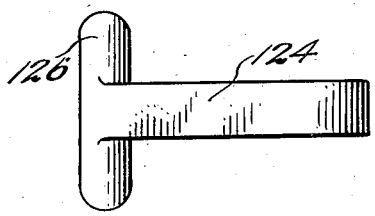
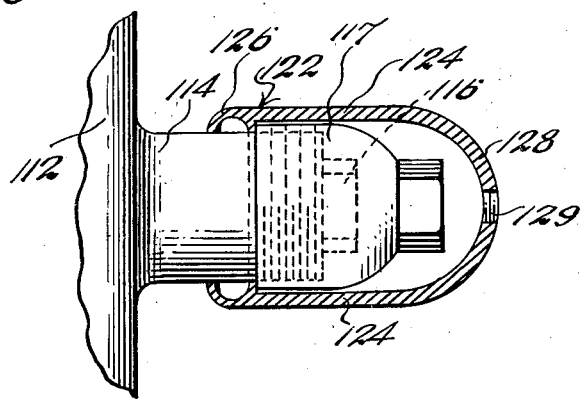
Inventor
JOHN C. ARRISON.
By *Clarence A. O'Brien
and Harvey B. Jacobson*
Attorneys Patented June 22, 1948

2,443,760

UNITED STATES PATENT OFFICE 2,443,760

UNIVERSAL HUBCAP FOR AUTOMOBILES

John C. Arrison, Hartford, Conn.

Application October 26, 1946, Serial No. 705,849

5 Claims. (Cl. 301—37)

1

The present invention relates to novel and useful improvements in a hub-cap for automobiles and more specifically pertains to an attachment which may be applied to conventional automobile wheels for securing an ornamental and universal hub-cap thereon.

The principal objects of this invention reside in the provision of an attachment for securing a single type of hub cap to various types of automobile wheels; to provide a device which is particularly adapted to be secured in position by conventional automobile wheel structure; which may be readily assembled or removed as desired; wherein the conventional automobile wheel hub-cap is retained for use as a grease or dust cap in the device; and wherein a single means is provided for facilitating the application of the conventional hub-cap and my universal hub-cap to vehicle wheels or their removal therefrom.

These, together with various ancillary objects of the invention which will later become apparent as the following description proceeds, are realized by my device, the accompanying drawings of which are to be regarded as illustrative only, and wherein:

Figure 1 is an elevational view of a vehicle wheel indicating the manner of attaching my universal hub-cap thereto;

Figure 2 is a view taken at right angles to Figure 1, parts being broken away and shown in section for the purpose of more clearly illustrating the construction;

Figure 3 is a fragmenetary detailed view in vertical section of the device shown in Figure 1, and is taken substantially upon the section line 3—3 of Figure 1;

Figure 4 is a view similar to Figure 3 but showing a modified form of my invention;

Figure 5 is a side view of the attachment shown in Figure 4;

Figure 6 is a top plan view of Figures 4 and 5;

Figure 7 is a further modified form of attaching means shown in side elevation; and, Figure 8 is a bottom plan view of Figure 7.

Referring now more specifically to the accompanying drawings, wherein like numerals indicate similar parts throughout the various views, the numeral 10 designates generally a vehicle automotive wheel of any suitable type and which is provided with a brake drum 12 and a hub portion 14. In the form of the invention shown in Figures 1-3, 16 indicates a conventional wheel hub-cap and which, as will be understood, varies with different models of automobiles, while 18 indicates an axle nut of known type for securely

2 fastening the hub 14 of a wheel upon the axle of a vehicle. In accordance with the dictates of my invention, I provide a single convexly shaped hub-cap 20 which is so proportioned as to fit at its periphery within the inner rim of the vehicle rim, whereby a single hub-cap may be provided for all wheels of a given size for embellishing the appearance thereof, replacing lost hub-caps by a single cap adapted to fit all makes of cars having the same wheel size, and which is mounted upon a vehicle wheel as set forth hereinafter. The conventional hub-cap 16 is removed, and the axle nut 18 is released and my adapter unit indicated generally at 22 is secured upon the vehicle axle and is retained by replacing the axle nut 18.

This attachment, as shown best in Figure 3, consists of a yoke-like member having parallel sides 24 disposed generally parallel to the vehicle axle and having the extremities of these sides or arms 24 united by a base plate 26 and a head piece 28. The base plate is suitably apertured for engagement upon the axle, while the head plate 28 is adapted for threaded engagement by a fastening bolt 30. The universal hub-cap 20 is disposed upon the shank of the fastening bolt 30, and is rigidly retained against the enlarged head thereof by a spacing member or collar 32, which may then be rigidly attached to the fastening bolt 30 in any suitable manner, while the conventional hub-cap 16 is suitably apertured for loose reception upon the shank of the fastening means 30.

By this fastening construction, when the bolt 30 is tightly screwed to the head plate 28 of my attachment 22, the conventional hub-cap 16 is drawn tightly against the vehicle wheel 10, as shown in Figure 2, and constitutes a dust cap or shield enclosing the end of the axle and my attachment 22, while my universal hub-cap 20 is drawn at its periphery into seating engagement with the vehicle wheel 10 adjacent the inner periphery thereof in firm and rigid engagement therewith.

Attention is next directed specifically to the form of my invention shown in Figures 4, 5 and 6, which embodiment is adapted for engagement upon the front wheels of vehicles which rotate upon spindles rather than upon live axles. It will be understood that in this embodiment the same conventional hub-cap 16 and universal hub-cap 20 and fastening means 30, 32 are employed as in the preceding embodiment. However, the drum 112 of a wheel, not shown, and provided with a hub 114 is journalled upon a spindle, not shown, by the conventional type of bearing construction, and is retained thereon by a fastening nut 116 indicated in dotted lines in Figure 4. The usual type of grease retaining hub-cap 117 is adapted to enclose the nut 116 and has threaded engagement with the exterior surface of the hub 114 in a manner well-known in the art. In applying my invention to this form of construction, the grease retaining hub-cap 117 is first removed from the vehicle wheel.

My attachment indicated generally at 122 is now applied upon the hub 114. This attachment comprises an annular base member 126 which is preferably semi-circular in cross-section as shown in Figure 4, and from which rise a pair of parallel arms 124, which are integrally joined at the top by a curved head plate 128 suitably apertured and screw threaded as at 129 to receive the above mentioned fastening means. The attachment 122 is disposed upon the hub 114, it being understood that the annular portion 126 has its inwardly disposed edges tightly embracing the hub 114, in order to frictionally engage the same. I contemplate appropriate deformation of the edges of the member 126 in order to perform this purpose, and after the same has been tightly fitted upon the hub 114, the grease retaining hub-cap 117 is threaded upon the hub 114 and engages the inwardly projecting surfaces of the base 126 for retaining the latter upon the hub. The conventional hub-cap 16 and my universal hub-cap 20 referred to in the preceding example are attached to the attachment in the same manner as set forth in the preceding embodiment.

Attention is next directed to a third embodiment of the invention as shown in Figures 7 and 8, and wherein a yoke-like attachment 222 of similar shape to that of 122 shown in Figure 4, is provided. In this form, however, the parallel side or arm members 224 with their integrally formed, convex head plate portions 228 are welded or otherwise rigidly secured to an annular strap or ring 226 constituting a base member. One arm 224 and the continuous portion of the base member 226, are apertured to receive a set screw 230 for detachably securing the base member and the attachment to a vehicle hub, not shown, such as that depicted in Figure 4. In this form, it will be readily seen that it is unnecessary to remove the grease retaining cap such as shown at 117 in Figure 4, since this device may be readily inserted thereover and engaged upon the hub portion of the wheel. As in the preceding embodiments, the conventional hub-cap 16 and my universal hub-cap 20 are secured by a fasten-means 30 to the convex head 228 of the attachment.

From the foregoing, it is believed that the manner of construction and method of operation of my device will now be readily understood, and further explanation is therefore deemed to be unnecessary.

I claim as my invention:

1. In combination with the axle, hub and hub-cap of a vehicle wheel, a yoke comprising a pair of parallel arms, a base secured to one end of said arms, and a bridge uniting the other ends thereof, means for detachably securing said base to a wheel hub, means for detachably securing a conventional wheel hub-cap to said bridge, and a second hub-cap enveloping said conventional hub-cap and mounted on said last-mentioned means.

2. In combination with the axle, hub and hub-cap of a vehicle wheel, a yoke comprising a pair of parallel arms, a base secured to one end of said arms, and a bridge uniting the other ends thereof, means for detachably securing said base to a wheel hub, means for detachably securing a conventional wheel hub-cap to said bridge, and a second hub-cap enveloping said conventional hub-cap and mounted on said last mentioned means, and a spacer on said last-mentioned means interposed between said hub-caps.

3. In combination with the axle, hub and hub-cap of a vehicle wheel, a yoke comprising a pair of parallel arms, a base secured to one end of said arms, and a bridge uniting the other ends thereof, means for detachably securing said base to a wheel hub, means for detachably securing a conventional wheel hub-cap to said bridge, and a second hub-cap enveloping said conventional hub-cap mounted on said last-mentioned means, said base being flat and secured upon an axle between a wheel hub and its axle nut.

4. In combination with the axle, hub and hub-cap of a vehicle wheel, a yoke comprising a pair of parallel arms, a base secured to one end of said arms, and a bridge uniting the other ends thereof, means for detachably securing said base to a wheel hub, means for detachably securing a conventional wheel hub-cap to said bridge, and a second hub-cap enveloping said conventional hub-cap and mounted on said last-mentioned means, said base comprising an annular member of semi-cylindrical cross-section, said annular member being positioned upon a wheel hub and retained thereon by a grease cap.

5. In combination with the axle, hub and hub-cap of a vehicle wheel, a yoke comprising a pair of parallel arms, a base secured to one end of said arms, and a bridge uniting the other ends thereof, means for detachably securing said base to a wheel hub, means for detachably securing a conventional wheel hub-cap to said bridge, and a second hub-cap enveloping said conventional hub-cap and mounted on said last mentioned means, and a spacer on said last-mentioned means interposed between said hub-caps, said base being retained upon a wheel hub by a set screw.

JOHN C. ARRISON.

REFERENCES CITED

The following references are of record in the file of this patent:

UNITED STATES PATENTS

| Number | Name | Date |
| --- | --- | --- |
| 2,329,301 | Shaw | Aug. 31, 1943 |

FOREIGN PATENTS

| Number | Country | Date |
| --- | --- | --- |
| 279,319 | Italy | Nov. 8, 1930 |